United States Patent
Richter et al.

(10) Patent No.: US 9,242,526 B2
(45) Date of Patent: Jan. 26, 2016

(54) AIR CONDITIONING SYSTEM FOR A MOTORIZED VEHICLE

(71) Applicant: VISTEON GLOBAL TECHNOLOGIES, INC., Van Buren Township, MI (US)

(72) Inventors: Gerald Richter, Aachen (DE); Sezgin Gökcen, Köln (DE)

(73) Assignee: Hanon Systems, Daejeon-si (KR)

( * ) Notice: Subject to any disclaimer, the term of this patent is extended or adjusted under 35 U.S.C. 154(b) by 330 days.

(21) Appl. No.: 14/016,280

(22) Filed: Sep. 3, 2013

(65) Prior Publication Data

US 2014/0060103 A1    Mar. 6, 2014

(30) Foreign Application Priority Data

Aug. 31, 2012 (DE) .......................... 10 2012 108 070

(51) Int. Cl.
  *F25D 17/04* (2006.01)
  *B60H 1/00* (2006.01)

(52) U.S. Cl.
  CPC ........ *B60H 1/00028* (2013.01); *B60H 1/00207* (2013.01); *B60H 1/00542* (2013.01)

(58) Field of Classification Search
  CPC ............ F25D 17/065; F25D 2317/067; B60H 1/00371; B60H 2001/00235
  USPC .................... 62/244, 407, 414, 419; 55/385.3
  See application file for complete search history.

(56) References Cited

U.S. PATENT DOCUMENTS

| 2,212,503 A | * | 8/1940 | Nickell | .............. | B60H 1/00007 165/202 |
| 2004/0089004 A1 | * | 5/2004 | Ogiso | ................ | B60H 1/00064 62/203 |

FOREIGN PATENT DOCUMENTS

| DE | 19613345 A1 | 10/1997 |
| DE | 10037384 A1 | 2/2002 |
| DE | 102005029774 A1 | 3/2006 |
| DE | 60022097 T2 | 6/2006 |
| EP | 1634735 A1 | 3/2006 |
| EP | 1705040 A1 | 9/2006 |
| EP | 1820676 A1 | 8/2007 |
| WO | 2005110783 A1 | 11/2005 |

\* cited by examiner

*Primary Examiner* — Melvin Jones
(74) *Attorney, Agent, or Firm* — Fraser Clemens Martin & Miller LLC; James D. Miller

(57) ABSTRACT

The invention relates to an air conditioning system for a motorized vehicle with means for conveying, for cooling, and for heating of air. The air conditioning system comprises a housing with flow guide devices and air vents, an evaporator, and a heat exchanger. The housing is developed with an air distribution element and a range of variation. The flow guide devices of the air vents are arranged within the air distribution element, and the heat exchanger is arranged within the range of variation. With the arrangement of the heat exchanger, it is possible to change the outer dimensions of the range of variation and therefore of the air conditioning system while maintaining unchanged functionality and by using identical components such that the air conditioning system can be adapted to the installation space of different motorized vehicle types.

20 Claims, 1 Drawing Sheet

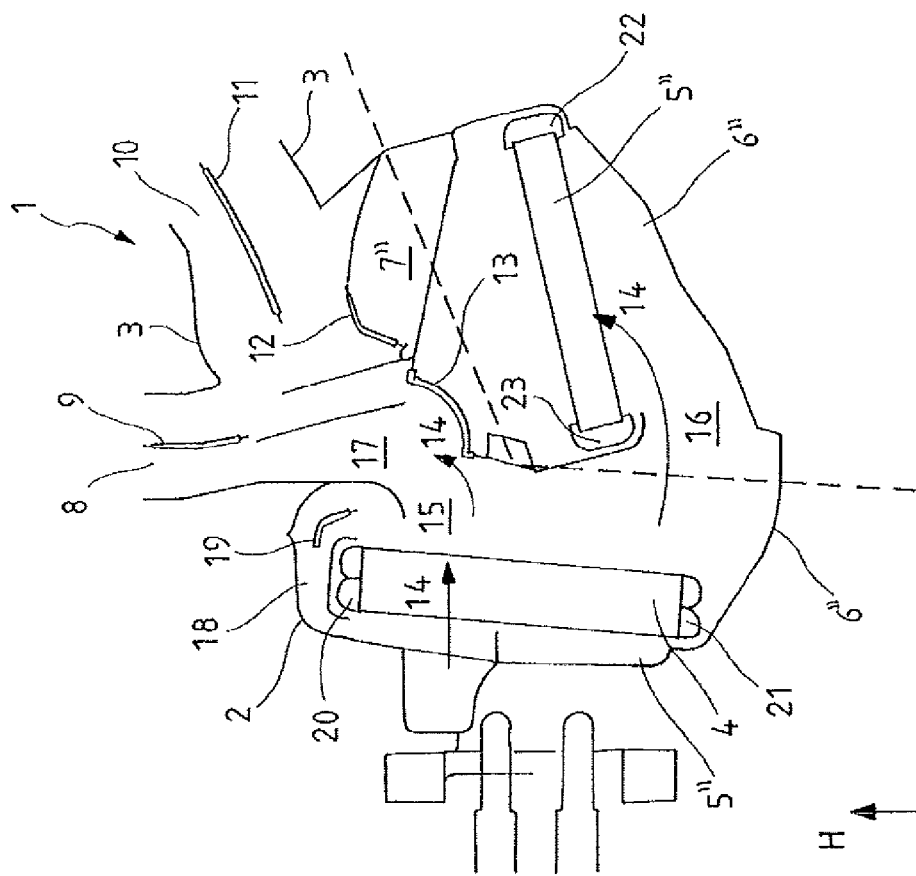
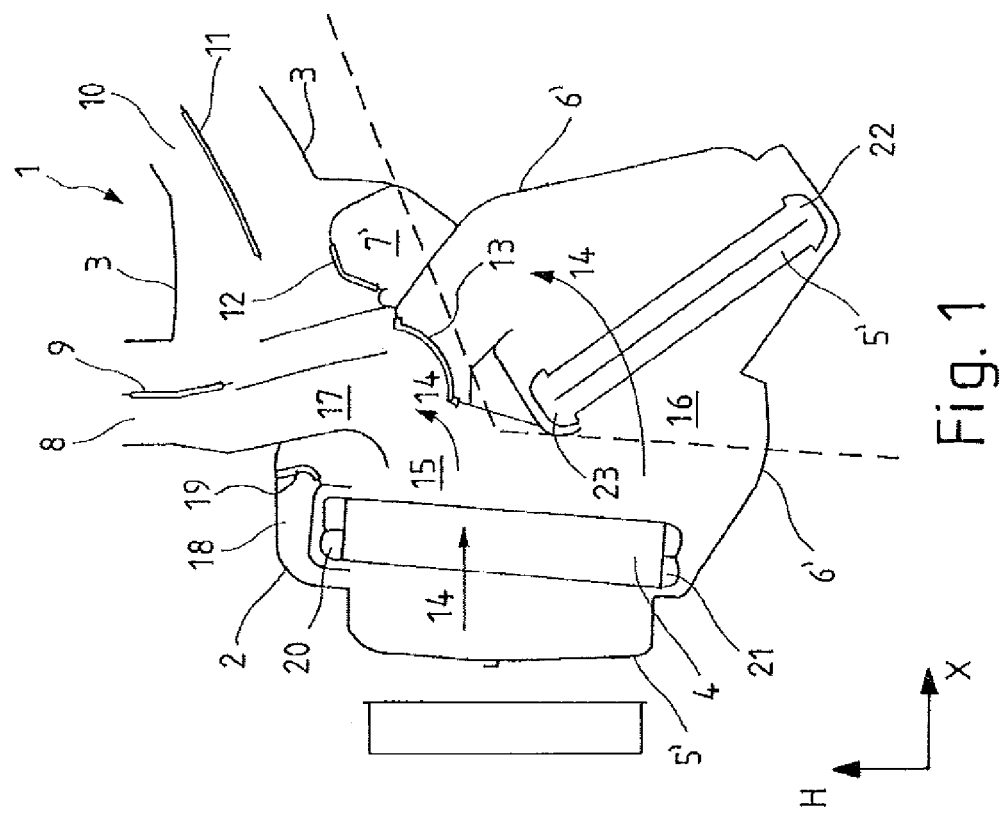

AIR CONDITIONING SYSTEM FOR A MOTORIZED VEHICLE

CROSS-REFERENCE TO RELATED APPLICATION

This application claims priority to German Non-Provisional Patent Application Serial No. DE 10 2012 108 070.4 filed Aug. 31, 2012, hereby incorporated herein by reference in its entirety.

FIELD OF THE INVENTION

The invention relates to an air conditioning system for a motorized vehicle with means for conveyance, for cooling and for heating of air, comprising a housing with flow guide devices and air vents, an evaporator, and a heat exchanger. The housing is partitioned into different elements which are designed so that they can be assembled.

BACKGROUND OF THE INVENTION

Due to the increasing number of technical components in motorized vehicles, it is necessary that these components be optimized with respect to the installation space, in order to ensure the desired large number of functionalities by means of accommodating these elements. One requirement is for an air conditioning system of a motorized vehicle for conditioning a supplied air mass flow to split supplied air mass flow up and guide the individual air mass flows into different areas of the vehicle. This requirement consists in the optimal use of the available limited installation space.

When designing the air conditioning systems, their design is adapted to the available space within the motorized vehicles and therefore individually for a particular vehicle model of a model series. Like this, vehicle models and/or vehicle platforms, which comprise at least two differently designed installation spaces for the air conditioning system, traditionally have at least two different versions of the air conditioning system developed. The divergent designs of the air conditioning systems differ both in their exterior form as well as in the components used.

The use of the differently designed air conditioning systems depending on the vehicle models in addition to the high cost of design also results in the same high expense of production and development for the required components in the different versions as well as further added costs, such as for storage and transportation. Depending on the required development of the air conditioning system in the respective motorized vehicle, divergent air conditioning housings must be provided and equipped with components. In addition to the appropriate tools for the divergent air conditioning systems, specially adapted processes are also necessary, for example during the assembly.

Air conditioning systems with modular housings are known in the art. They have variable functionality and components with variable dimensions. European Pat. Appl. Pub. No. EP 1 634 735 A1 thus describes a motorized vehicle air conditioning system in which a part of the housing is designed for different-zoned air conditioning systems, wherein at least the configuration of a blower, an evaporator and a heat exchanger is the same in the different-zoned air conditioning systems. The housing of the air conditioning system is differently designed for the various versions and can be modified with accessories or replacement parts. The changes of the housing and the accessories or replacement parts will vary the functionality of the air conditioning system with respect to the design with different zones.

German Pat. Appl. Pub. No. DE 100 37 384 A1 discloses a heating and air conditioning system for a motorized vehicle with an air conditioning system housing with multiple air vents for the supply of air to the front zones of the motorized vehicle interior. The air conditioning system housing, in which a heat exchanger is arranged, comprises a connecting section provided with an air vent for the connection of a front air conditioning unit that can be optionally connected as a booster module, which can be tightly sealed with a detachable closure component, if not used. The air conditioning housing therefore forms a basic module, to which a corresponding rear passenger compartment air conditioning unit can be allocated as a booster module. The heating and air conditioning system can be used to control the temperature in the front and in the rear compartment, as needed.

European Pat. No. EP 1 705 040 B1 describes an air conditioning apparatus of a passenger compartment of any vehicle in a motorized vehicle model series. The apparatus has a lower housing with a front and a rear part. Within this housing, heat exchangers with a predetermined width and a predetermined tilt in relation to the horizontal are arranged, which are constant and specific for the model series. The heat exchangers moreover have a specific height that can be varied for a particular vehicle, which is between a minimum and a maximum height, which are also specific for the model series.

German Pat. Appl. Pub. No. DE 196 13 345 A1 presents a heating or air conditioning system with a housing, which is easily assembled and is suitable for variable installation in a motorized vehicle in which the instrument panel is arranged on the left or on the right side. The housing consists of a blower segment and a heat exchanger segment, which in each case are symmetrically assembled and which can be reciprocally latched by mechanical components and which makes a mirror image installation possible, relative to the longitudinal axis of the motorized vehicle, wherein the dimensions of the instrument panel components can be designed invariable.

The modular configuration of the blower segment and of the heat exchanger segment facilitates the independent configuration of the segments concerning their outside dimensions.

Something unique with the known systems from the prior art is that the modular configuration with different components and booster modules or expansion features increase the functionality of the air conditioning systems and expand possible applications, such as different multi-zoned air conditioning systems, in connection with different vehicle models of a motorized vehicle model series, and make the location near the instrument panel more variable. However, the known air conditioning systems indicate no possibility of adapting an air conditioning system easily to different installation spaces if the functionality of the system is to remain unchanged and by using identical components.

SUMMARY OF THE INVENTION

The purpose of the present invention is to provide an air conditioning system with an air distribution system, which can be adapted to different installation spaces with simple means, in particular to a high and shallow installation space and is adaptable for use in different types of motorized vehicles. It should be possible to use the same components in each case. The intention is to minimize the costs incurred, particularly for the development, the design, the manufacture, the assembly and the maintenance.

The objective is solved by an air conditioning system for a motorized vehicle according to an embodiment of the invention. The air conditioning system includes means for conveying and for conditioning, in particular for cooling, for heating and for dehumidification of air. The air conditioning system further includes a housing with flow guide devices and air vents, an evaporator and a heat exchanger. In this context, the evaporator preferably is a component of a coolant circuit.

According to an embodiment of the invention, the housing is formed from an air distribution element and a range of variation. The flow guide devices of the air vents are arranged within the air distribution element. A blower for conveying the air through the air conditioning system and a blower evaporator element of the housing essentially also remain unchanged in case of a different configuration of the range of variation. The essentially unchanged configuration of the blower evaporator element refers to the different and thus variable configuration of the range of variation. Because of the invariable air intake system and the invariable arrangement of the air vents as well as the associated flow guide devices within the air distribution element, the air distribution of the air conditioning system remains essentially constant by using different ranges of variations.

In accordance with another embodiment of the invention, the heat exchanger is arranged within the range of variation. By combining divergent ranges of variations with an otherwise invariable air distribution element and blower evaporator element, the air conditioning system can be utilized with identical components for different types of motorized vehicles. By using identical components within the air conditioning system, the functionality of the system remains unchanged, even when using differently designed ranges of variations.

It is to be understood that by designing the components of the air conditioning system as identical parts, the identical components are used both in terms of quantity as well as in their design and functionality. In this context, flow guide devices developed as flaps are arranged at identical locations in each case. Because of the uniform arrangement of the flow guide devices, even other associated components, such as the kinematics of flow guide devices, can be designed as identical parts.

Since the principal areas of the air conditioning system are designed identically, the costs for development and design as well as the production costs are reduced because of the plurality of identical components and a greatly simplified design By arranging the heat exchanger within the range of variation, according to an embodiment of the invention, the external dimensions of the range of variation as well as the air conditioning system can be changed while maintaining unvaried functionality, so that the air conditioning system can be adapted to the installation space of the motorized vehicle type.

The modular design of the housing thus provides an air conditioning system that is variable in terms of space requirements to meet different space availability conditions within the miscellaneous types of motorized vehicles. The modular housing configuration facilitates a variable configuration of the range of variation, for example its external dimensions, irrespective of the otherwise invariable air distribution element and of the invariable blower evaporator element. The air conditioning system can thus be adapted to the available space within the motorized vehicle as needed, wherein the installation space of the air conditioning system is adapted to the available space in the motorized vehicle by the selection and configuration of the range of variation.

According to an embodiment of the invention, the adaptation of the installation space of the air conditioning system is done by aligning and/or orienting the heat exchanger within the range of variation of the housing as well as the development and the configuration of the air vent for the footwell.

According to another embodiment of the invention, the heat exchanger is arranged aligned in the direction of the height H such that the dimensions of the range of variation as well as of the air conditioning system require a tall installation space. In this context, the height H is defined so that it is aligned perpendicular to the horizontal X.

The external dimensions of the heat exchanger preferably comprise a rectangular shaped inflow side with a certain depth. The depth direction corresponds to the thickness of the heat exchanger, which is less compared to the dimensions of the inflow side. By the alignment of the heat exchanger in direction of the height H, it is now to be understood that the depth direction of the heat exchanger is essentially in the direction of the horizontal X and that the inflow side is aligned in the direction of the height H. According to this embodiment, the heat exchanger is arranged so that it is aligned at an angle between 45° and 90° in relation to the direction of the horizontal X.

According to a further embodiment of the invention, the heat exchanger is arranged such that it is aligned in the direction of the horizontal X, so that the dimensions of the range of variation and the air conditioning system require a shallow installation space. By aligning the heat exchanger in the direction of the horizontal X, it is to be understood that the depth direction of the heat exchanger is essentially aligned in the direction of the height H, and the inflow side is aligned in the direction of the horizontal X. According to this embodiment, the heat exchanger is preferably arranged at an angle between −20° and 20° relative to the direction of the horizontal X.

A further embodiment of the invention consists in that the air distribution element forms a first flow path and the range of variation forms a second flow path. In this instance, the heat exchanger which is arranged within the range of variation covers the entire cross-section of the second flow path, so that the air mass flow conveyed by the second flow path is directed completely across the heat-transfer surface of the heat exchanger. The airflows through the flow paths can be controlled by a flow guide device. In the first end position of the flow guide device which closes the second flow path, the entire air mass flow conveyed across the evaporator of the air conditioning system flows through the first flow path and thus around the heat exchanger. By the stepless adjustment of the flow guide device of the second flow path, the air mass flow is proportionately split into both flow paths. In the second end position of the flow guide device, the first flow path is closed, so that the entire air mass flow flows through the second flow path and therefore through the heat exchanger. The first flow path in the direction of the height H of the air conditioning system is preferably arranged above the second flow path, which includes the heat exchanger.

An embodiment of the invention consists in that the range of variation comprises a flow duct of the air vent for the footwell.

According to an embodiment of the invention, the range of variation is encompassed by the air distribution element. Consequently, the range of variation is a partial area of the otherwise invariable air distribution element. The air distribution elements with their divergent form are merely different with respect to the development of the range of variation.

According to another embodiment of the invention, the air distribution element and the range of variation are developed as divergent elements of the housing which can be joined. The range of variation and the air distribution element are therefore developed as a divergent element in each case. The invariable air distribution element can be combined with differently developed ranges of variation.

The solution according to the embodiments of the invention has further miscellaneous advantages such as considerably reduced times for structural design and development, considerably reduced costs for structural design and development, and an increased degree of using identical parts to reduce process times and costs of investment as well as reduced complexity for assembly and maintenance, by adaptation of the assembly concepts of various equipment to different installation spaces.

BRIEF DESCRIPTION OF THE DRAWINGS

Further details, features and benefits of embodiments of the invention will emerge from the following description of sample embodiments with reference to the accompanying drawings. There are shown:

FIG. 1 is an air conditioning system for a tall installation space, where a heat exchanger is pitched steeply; and FIG. 2 is an air conditioning system for a shallow installation space, where a heat exchanger is aligned flat.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

FIG. 1 illustrates an air conditioning system 1 for space conditions with a tall installation space. In each case, a road is indicated by a horizontal X. The direction perpendicular to the horizontal X corresponds to a height H, so that the tall installation space refers to the design of the air conditioning system 1 in the direction of the height H. In this context, a heat exchanger 5' is arranged pitched steeply. "Pitched steeply" is to be understood as the alignment of the heat exchanger 5' essentially in the direction of the height H. The heat exchanger 5' is arranged at an angle of 45° and larger relative to the horizontal X. The horizontal X of the air conditioning system 1 corresponds to a position of a motorized vehicle relative to the road.

An air mass flow supplied by a blower [not shown] to a housing of the air conditioning system 1 in a airflow direction 14 is directed across different heat exchangers 5'. For this purpose, the air is cooled and/or dehumidified while it flows across a heat transfer surface of an evaporator 4 and, if required, is heated up when it flows across the heat transfer surface of the heat exchanger 5' again. After the air is conditioned, the air is supplied into a passenger compartment. It is blown through a footwell air vent 7', for example, and through a passenger air vent 10 in the instrument panel into the passenger compartment, and is additionally supplied through a windshield air vent 8 designed as a defrost opening directly onto the windshield for demisting or for defrosting.

The individual flow path leading to the evaporator 4 in the airflow direction 14 of air is split into a first flow path 15 and a second flow path 16 downstream of the evaporator 4. The first flow path 15 supplies the air that was cooled and/or dehumidified in the evaporator 4 to flow around the heat exchanger 5' as part of the air mass flow. In this context, the first flow path 15 in a direction of the height H is arranged above the heat exchanger 5'. The cooled and/or dehumidified air is directed in the second flow path 16 as part of the air mass flow to flow across or through the heat exchanger 5'. This partial air mass flow is consequently heated again. The heat exchanger 5' occupies the entire cross-section of the second flow path 16.

The first flow path 15 is a bypass path around the heat exchanger 5' and the second flow path 16 is a path integrated with the heat exchanger 5'. Both the first flow path 15 and the second flow path 16 terminate in a common area, which is developed as a mixing chamber 17. The second flow path 16 is bounded towards the mixing chamber 17 by means of a flow guide device 13 that is developed as a flap. The flow guide device 13 is used for the stepless opening and closing of the flow paths 15, 16.

If the flow guide device 13 is open, the air supplied into the air conditioning system 1 is split into both the first flow path 15 and the second flow path 16. The partial air mass flows resulting from the split flow paths 15, 16, are combined again and mixed in the mixing chamber 17 before the air that is conditioned is supplied into the passenger compartment by means of the air vents 7', 8, 10.

The second flow path 16 is closed when the flow guide device 13 is in a first end position. The entire air mass flow is directed through the first flow path 15, and therefore around the heat exchanger 5' into the mixing chamber 17. The previously cooled and/or dehumidified air mass flow will not be heated.

In a second end position (not shown) of the flow guide device 13, the first flow path 15 is closed, so that the entire air mass flow flows through the open second flow path 16 and therefore across or through the heat exchanger 5'.

The air mass flows supplied into the passenger compartment through the air vents 7', 8, 10, are split by means of additional flow guide devices 9, 11, 12, which are developed as flaps. The flow guide devices 9, 11, 12 respectively serve for the stepless opening and closing of the air vents 7', 8, 10.

The housing of the air conditioning system 1 has elements or housings that are independent of each other, wherein an inflow area, an air inlet, the blower, a filter, and the evaporator 4 are arranged within a blower evaporator element 2, and the mixing chamber 17, the air vents 7', 8, 10, the flow guide devices 9, 11, 12, and the heat exchanger 5' are arranged within an air distribution element 3. In this context, the heat exchanger 5' is supported within a range of variation 6' of the air distribution element 3. The range of variation 6' is therefore a partial area of the air distribution element 3. According to an alternative embodiment, the range of variation 6' can also be developed as a separate element of the housing and thus be separate or independent of the air distribution element 3.

On a first narrow side 20, the evaporator 4 is arranged tightly connected to and supported with the wall of the blower evaporator element 2. The wall of the blower evaporator element 2 has a bypass 18 with a flow guide device 19 in an inlet area of the evaporator 4. If the flow guide device 19, which is arranged as a flap, is open, a part of the air mass flow supplied into the housing is passed around the evaporator 4 as a partial air mass flow, wherein the partial air mass flow conveyed through the bypass 18 stays unconditioned. The partial air mass flow in relation to the total air mass flow that is passed around the evaporator 4 is controlled by means of the stepless adjustment of the flow guide device 19.

Moreover, the mixing chamber 17 and all air vents 7, 8, 10 as well as the associated flow guide devices 9, 11, 12, are developed within the air distribution element 3. The walls of the air distribution element 3 bound the mixing chamber 17.

Likewise, a discharge section into the mixing chamber 17 of the second flow path 16, in which the heat exchanger 5' is arranged, is also assigned to the air distribution element 3. Additional flow guide devices 7, 9 are developed within the mixing chamber 17, which are provided for specifically directing the partial air mass flows to the various air vents 7', 8, 10.

The range of variation 6' of the air distribution element 3 has a stop for a second narrow side 21 of the evaporator 4 which is opposite the first narrow side 20. The second narrow side 21 of the evaporator 4 abuts substantially close against the stop and therefore against a wall of the range of variation 6'. The evaporator 4 consequently occupies the entire flow cross-section of the air inlet into the housing. Only the bypass 18 provides an option to pass a partial air mass flow unconditioned past the evaporator 4.

The second flow path 16 is developed within the range of variation 6' of the air distribution element 3. The heat exchanger 5' is supported by the walls of the housing within the range of variation 6', wherein the connections between the wall and the heat exchanger 5' are developed technically sealed. The wall is provided with special recesses in the areas where the heat exchanger 5' is mounted.

In the embodiment of the air conditioning system 1 with a tall installation space illustrated in FIG. 1, a side of the heat exchanger 5' with a first narrow side 22 contacts and is supported by the outer wall of the housing extending downwards. A second narrow side 23 of the heat exchanger 5' is also arranged within a recess of the wall of the housing developed for mounting. The recess for mounting the second narrow side 23 of the heat exchanger 5' serves as a partition between the first flow path 15 and the second flow path 16 as well as a stop for the flow guide device 13 for opening and closing the second flow path 16.

The range of variation 6' of the air distribution element 3 borders the second flow path 16 with the outer wall. In this context, an edge area of the outer wall extends up to a second stop for the flow guide device 13 that belongs to the air distribution element 3.

In addition, a flow duct of the footwell air vent 7' is formed within the range of variation 6'. The associated flow guide device 12 is to be assigned to the air distribution element 3. The flow guide device 11 is arranged between a first wall and a second wall developed by the air distribution element 3 which can close the passenger air vent 10 in connection with the two walls.

FIG. 2 illustrates the air conditioning system 1 for space conditions with a shallow installation space. In this context, the heat exchanger 5'' is arranged flat. By 'flat arrangement' it is to be understood that the heat exchanger 5'' is arranged essentially in the direction of the horizontal X, wherein the heat exchanger 5'' can be set up at a low angle from −20° to 20° relative to the horizontal X.

The embodiments of the air conditioning system 1 according to FIGS. 1 and 2 differ merely in the arrangement of the heat exchanger 5', 5'' as well as in the development of the range of variation 6', 6'' of the air distribution element 3 with the footwell air vent 7', 7''.

Reference numerals similar to those used in the embodiment shown in FIG. 1 are used regarding the functionality of the air conditioning system 1 with the evaporator 4 in connection with the heat exchanger 5'' and the flow paths 15, 16 as well as the development of the blower evaporator element 2 and the air distribution element 3 with the mixing chamber 17, the air vents 7'', 8, 10 and the flow guide devices 9, 11, 12, 13, 19.

The developments of the blower evaporator element 2 and the air distribution elements 3 remain unchanged during application and in connection with the different ranges of variation 6', 6'' of the air distribution elements 3 in their embodiments. The evaporator 4 and all flow guide devices 9, 11, 12, 13, 19 developed as flaps, are arranged at the same position within the blower evaporator element 2 and the air distribution element 3, so that the air distribution architecture remains the same with the differently developed ranges of variation 6', 6'' in connection with the blower evaporator element 2 and the air distribution element 3.

The range of variation 6', 6'' can in turn be developed as a partial area of the air distribution element 3 or as a separate element of the housing and can therefore be developed separately or independently of the air distribution element 3. The arrangement of the heat exchanger 5', 5'' and therefore the orientation and the alignment of the heat transfer surface of the heat exchanger 5', 5'' deviate from each other with respect to the different embodiments.

The range of variation 6'' also forms a stop for the second narrow side 21 of the evaporator 4 that is opposite the first narrow side 20 and the second flow path 16. The contact area between the wall of the range of variation 6'' and the evaporator 4 is developed technically sealed.

The heat exchanger 5'' is arranged within the second flow path 16 of the range of variation 6'' of the air distribution element 3 and is supported by the walls of the air distribution element 3, wherein also the connections between the wall and the heat exchanger 5'' are developed technically sealed. The wall in the areas for mounting the heat exchanger 5'' is provided with recesses such that the heat exchanger 5'' is arranged horizontally. In this context, "horizontal" is to be understood as the mode of assembly of the heat exchanger 5'' in which the airflow direction 14 of the air is essentially in the direction of the horizontal H.

The heat exchanger 5'' is aligned with the first narrow side 22 in direction of the horizontal X and is in contact with and supported on an outside wall of the range of variation 6''. The second narrow side 23 of the heat exchanger 5'' is also aligned and extends in the direction of the horizontal X and is arranged within the partition developed between the first flow path 15 and the second flow path 16 as well as a recess on the wall of the housing for a first stop for the flow guide device 13 for opening and closing the second flow path 16.

The wall of the range of variation 6'' bounding the second flow path 16 extends up to a second stop of the flow guide device 13 belonging to the air distribution element 3. The range of variation 6'' is developed such that the flow duct of the footwell air vent 7'' is integrated within the range of variation 6'' of the housing. Same as with the embodiment according to FIG. 1, the flow guide device 11 is arranged between the first and the second wall developed by the air distribution element 3, which can close the passenger air vent 10 in connection with the two walls.

Both in FIGS. 1 and 2, a broken line is used in each case to indicate the boundary between an invariable area, in particular of the blower evaporator element 2 and the air distribution element 3 and the respective components arranged therein, and the ranges of variation 6', 6'' which deviate from each other.

The heat exchanger 5', 5'' is supported within a range of variation 6', 6'' of the air distribution element 3. The range of variation 6', 6'' is therefore a partial area of the air distribution element 3. According to an alternative embodiment, the range of variation 6', 6'' can also be developed as a separate element of the housing and thus be separate or independent of the air distribution element 3.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE SYMBOLS

1 Air conditioning system
2 Housing, blower evaporator element
3 Housing, air distribution element
4 Evaporator
5', 5" Heat exchanger
6', 6" Housing, range of variation
7' 7" Footwell air vent
8 Windshield air vent
9 Flow guide device, flap
10 Passenger air vent
11 Flow guide device, flap
12 Flow guide device, flap
13 Flow guide device, flap
14 Airflow direction
15 First flow path
16 Second flow path
17 Mixing chamber
18 Bypass
19 Flow guide device, flap
20 First narrow side, evaporator
21 Second narrow side, evaporator
22 First narrow side, heat exchanger
23 Second narrow side, heat exchanger
X Horizontal
H Height

What is claimed is:

1. An air conditioning system for a vehicle comprising:
a blower evaporator element configured for receiving a flow of air and having an evaporator disposed therein;
an air distribution element disposed downstream from the blower evaporator element and configured for guiding the flow of air to a passenger compartment, wherein the air distribution element forms a first flow path for the flow of air;
a range of variation in fluid communication with the air distribution element, the range of variation having external dimensions corresponding to dimensions of an installation space of the vehicle, wherein the range of variation forms a second flow path for the flow of air; and
a heat exchanger disposed in the range of variation, wherein the heat exchanger is aligned with the cross-section of the second flow path.

2. The air conditioning system of claim 1, wherein the heat exchanger is arranged at an angle relative to a horizontal direction of the air conditioning system.

3. The air conditioning system of claim 2, wherein the angle is between 45 degrees and 90 degrees.

4. The air conditioning system of claim 2, wherein the angle is between −20 degrees and 20 degrees.

5. The air conditioning system of claim 1, wherein the air distribution element includes at least a first flow guide device and at least one air vent disposed therein.

6. The air conditioning system of claim 5, wherein the first flow guide device has an open position configured to divide the flow of air between the first flow path and the second flow path.

7. The air conditioning system of claim 5, wherein the first flow guide device transitions from a first end position to a second end position, wherein the first end position directs the flow of air through the first flow path to the air distribution element, and the second end position directs the flow of air through the second flow path to the air distribution element.

8. The air conditioning system of claim 5, wherein the air distribution element has a second flow guide device configured to open and close a footwell air vent, a third flow guide device configured to open and close a windshield air vent, and a third flow guide device configured to open and close a passenger air vent.

9. The air conditioning system of claim 1, further comprising a mixing chamber disposed in the air distribution element, wherein the first flow path and the second flow path terminate at the mixing chamber to combine the flow of air through the first flow path and the flow of air through the second flow path.

10. The air conditioning system of claim 1, wherein a flow guide device is disposed in the blower evaporator element configured to open and close a bypass flow path, the bypass flow path formed around the evaporator.

11. The air conditioning system of claim 1, further comprising a flow duct of a footwell air vent disposed in the range of variation.

12. The air conditioning system of claim 1, wherein the range of variation is one of a portion of the air distribution element and a separately formed element from the air distribution element.

13. An air conditioning system for a vehicle comprising:
a blower evaporator element having an evaporator disposed therein;
an air distribution element in fluid communication and disposed downstream from the blower evaporator element, the air distribution element configured for receiving at least a first flow of air through a first flow path and a second flow of air through a second flow path; and
a first range of variation with a first set of external dimensions in fluid communication with the blower evaporator element and the air distribution element, the first range of variation being interchangeable with at least a second range of variation with a second set of external dimensions, each of the first range of variation and the at least second range of variation form the second flow path, wherein each of the first range of variation and the at least second range of variation have a heat exchanger arranged therein for alignment with a cross-section of the second flow path.

14. The air conditioning system of claim 13, wherein the heat exchanger is arranged at an angle relative to a horizontal direction of the air conditioning system, wherein the angle is one of between 45 degrees and 90 degrees and between −20 degrees and 20 degrees.

15. The air conditioning system of claim 13, wherein the air distribution element includes a plurality of flow guide devices and a plurality of air vents disposed therein.

16. The air conditioning system of claim 15, wherein at least one of the plurality of flow guide devices has an open position configured to divide the flow of air between the first flow path and the second flow path, the at least one of the plurality of flow guide devices transitions from a first end position to a second end position, wherein the first end position directs the flow of air through the first flow path to the air distribution element, and the second end position directs the flow of air through the second flow path to the air distribution element.

17. The air conditioning system of claim 13, further comprising a mixing chamber disposed in the air distribution element, wherein the first flow path and the second flow path terminate at the mixing chamber to combine the flow of air through the first flow path and the flow of air through the second flow path.

18. An air conditioning system for a vehicle comprising:
a housing configured to be disposed in an installation space of the vehicle, the housing having a blower evaporator element and an air distribution element, the blower evaporator element configured for dehumidifying and cooling a flow of air and the air distribution element configured for receiving and distributing the flow of air to a passenger compartment;
a range of variation coupled with the housing and configured to receive at least a portion of the flow of air, the range of variation having a configuration formed to correspond to the installation space of the vehicle, the range of variation having a heat exchanger disposed therein, wherein the heat exchanger is arranged in a cross section of a flow path of the at least portion of the flow of air; and
wherein the housing is adapted to be coupled with varying configurations of the range of variation.

19. The air conditioning system of claim 18, wherein the heat exchanger is arranged at an angle relative to a horizontal direction of the air conditioning system, wherein the angle is one of between 45 degrees and 90 degrees and between −20 degrees and 20 degrees.

20. The air conditioning system of claim 18, wherein the air distribution element includes at least a first flow guide device and at least one air vent disposed therein, the first flow guide device has an open position configured to divide the flow of air between a first flow path formed in the air distribution element and the second flow path formed in the range of variation, wherein the first flow guide device transitions from a first end position to a second end position, wherein the first end position directs the flow of air through the first flow path to the air distribution element, and the second end position directs the flow of air through the second flow path to the air distribution element.

* * * * *